(12) United States Patent
Choi et al.

(10) Patent No.: US 8,856,258 B2
(45) Date of Patent: Oct. 7, 2014

(54) HOST DEVICE AND SLAVE DEVICE CONTROLLING METHOD

(75) Inventors: Myoung-soon Choi, Hwaseong-si (KR); Seung-hun Jeon, Seoul (KR); Lyun-sik Hyun, Seoul (KR); Sang-wook Cho, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 410 days.

(21) Appl. No.: 12/659,218

(22) Filed: Mar. 1, 2010

(65) Prior Publication Data

US 2011/0047239 A1 Feb. 24, 2011

(30) Foreign Application Priority Data

Aug. 18, 2009 (KR) ........................ 10-2009-0076287

(51) Int. Cl.
G06F 15/16 (2006.01)
G06F 15/173 (2006.01)
H04L 12/28 (2006.01)

(52) U.S. Cl.
CPC .................................. H04L 12/282 (2013.01)
USPC ........... 709/208; 709/203; 709/217; 709/227; 709/250

(58) Field of Classification Search
CPC .......... G06F 13/426; G06F 2213/0042; G06F 2213/3812; G06F 2213/4004; H04L 12/2803; H04L 12/2881; H04L 12/40019; H04L 12/40052; H04L 12/40202; H04L 12/403; H04L 29/08351; H04L 29/08846; H04L 29/12207; H04L 29/12254; H04L 29/12264; H04L 45/66; H04L 49/351; H04L 49/352; H04L 49/604; H04L 61/20; H04L 61/2038; H04L 61/2046; H04L 61/16; H04L 67/1051; H04L 2012/40208
USPC ........................................................ 709/208
See application file for complete search history.

(56) References Cited

U.S. PATENT DOCUMENTS

| 6,714,979 | B1 * | 3/2004 | Brandt et al. ................. 709/225 |
| 7,127,541 | B2 * | 10/2006 | Govindarajulu et al. ..... 710/300 |
| 7,339,895 | B2 * | 3/2008 | Ozaki et al. .................... 370/252 |
| 7,448,040 | B2 * | 11/2008 | Ellis et al. ..................... 719/310 |
| 7,464,174 | B1 * | 12/2008 | Ngai ............................. 709/234 |
| 7,532,114 | B2 * | 5/2009 | Stilp ........................ 340/539.22 |
| 7,548,987 | B2 * | 6/2009 | Jabri et al. .................... 709/231 |
| 7,555,570 | B2 * | 6/2009 | Hickey et al. ..................... 710/8 |

(Continued)

FOREIGN PATENT DOCUMENTS

WO WO 2007/099939 9/2007

OTHER PUBLICATIONS

Japanese Office Action dated Apr. 1, 2014 from Japanese Patent Application No. 2010-127219, 8 pages.

(Continued)

Primary Examiner — Melvin H Pollack
(74) Attorney, Agent, or Firm — Staas & Halsey LLP

(57) ABSTRACT

A host device is provided, which includes a network communication unit connected to network; a local communication unit locally connected to a slave device; a virtualization unit to virtualize the slave device as a network device within the network; and a controlling unit to control the virtualized slave device as the network device. Therefore, a developer may implement an application in consideration of a single type of network without considering various physical input and output ports.

21 Claims, 6 Drawing Sheets

(56) References Cited

U.S. PATENT DOCUMENTS

| | | | |
|---|---|---|---|
| 7,583,676 B2 * | 9/2009 | Shobatake | 370/395.1 |
| 7,594,005 B2 * | 9/2009 | Martin et al. | 709/223 |
| 7,606,927 B2 * | 10/2009 | Tasman et al. | 709/232 |
| 7,664,081 B2 * | 2/2010 | Luoma et al. | 370/338 |
| 7,725,602 B2 * | 5/2010 | Liu et al. | 709/245 |
| 7,730,210 B2 * | 6/2010 | Kuik et al. | 709/245 |
| 7,747,751 B2 * | 6/2010 | Chen | 709/226 |
| 7,752,360 B2 * | 7/2010 | Galles | 710/62 |
| 7,756,983 B2 * | 7/2010 | Mace et al. | 709/227 |
| 7,769,893 B2 * | 8/2010 | Goossens | 709/245 |
| 7,788,663 B2 * | 8/2010 | Illowsky et al. | 717/177 |
| 7,792,970 B2 * | 9/2010 | Bigioi et al. | 709/227 |
| 7,805,564 B2 * | 9/2010 | Matsunami et al. | 711/114 |
| 7,813,369 B2 * | 10/2010 | Blackmore et al. | 370/429 |
| 7,814,218 B1 * | 10/2010 | Knee et al. | 709/230 |
| 7,814,232 B2 * | 10/2010 | Satapati et al. | 709/249 |
| 7,814,533 B2 * | 10/2010 | Devine et al. | 726/3 |
| 7,814,541 B1 * | 10/2010 | Manvi | 726/15 |
| 7,818,486 B2 * | 10/2010 | McLeod | 710/313 |
| 7,843,907 B1 * | 11/2010 | Abou-Emara et al. | 370/386 |
| 7,844,687 B1 * | 11/2010 | Gelvin et al. | 709/220 |
| 7,848,913 B2 * | 12/2010 | Salmonsen | 703/23 |
| 7,864,702 B2 * | 1/2011 | Shah et al. | 370/254 |
| 7,873,059 B2 | 1/2011 | Morita et al. | |
| 7,886,033 B2 * | 2/2011 | Hopmann et al. | 709/223 |
| 7,912,046 B2 * | 3/2011 | Li et al. | 370/389 |
| 7,958,226 B2 * | 6/2011 | Bernardi et al. | 709/224 |
| 7,990,985 B2 * | 8/2011 | Chen | 370/401 |
| 8,045,550 B2 * | 10/2011 | LaVigne et al. | 370/389 |
| 8,065,435 B2 * | 11/2011 | Zhou et al. | 709/245 |
| 8,068,519 B2 * | 11/2011 | Zuili | 370/546 |
| 8,073,972 B2 * | 12/2011 | Jansen et al. | 709/245 |
| 8,089,953 B2 * | 1/2012 | Angelot et al. | 370/351 |
| 8,090,452 B2 * | 1/2012 | Johnson et al. | 700/17 |
| 8,194,654 B1 * | 6/2012 | Valencia | 370/389 |
| 8,194,674 B1 * | 6/2012 | Pagel et al. | 370/393 |
| 8,244,845 B2 * | 8/2012 | Rao | 709/223 |
| 8,249,071 B2 * | 8/2012 | Kreifeldt et al. | 370/392 |
| 2007/0150616 A1 * | 6/2007 | Baek et al. | 709/246 |
| 2009/0019141 A1 * | 1/2009 | Bush et al. | 709/223 |
| 2009/0232048 A1 * | 9/2009 | Lynch et al. | 370/328 |
| 2009/0252176 A1 | 10/2009 | Morita et al. | |
| 2009/0296718 A1 * | 12/2009 | Gefflaut et al. | 370/395.53 |
| 2009/0303926 A1 * | 12/2009 | Den Hartog et al. | 370/328 |
| 2010/0161771 A1 * | 6/2010 | Wang et al. | 709/221 |
| 2010/0214999 A1 * | 8/2010 | Kubo et al. | 370/329 |
| 2010/0274850 A1 * | 10/2010 | Mace et al. | 709/203 |
| 2010/0287266 A1 * | 11/2010 | Asati et al. | 709/222 |
| 2010/0313225 A1 * | 12/2010 | Cholas et al. | 725/62 |
| 2010/0318682 A1 * | 12/2010 | Kivinen et al. | 709/245 |
| 2011/0019650 A1 * | 1/2011 | van Niekerk | 370/338 |
| 2011/0167154 A1 * | 7/2011 | Bush et al. | 709/224 |

OTHER PUBLICATIONS

Kanda et al., "Current Status of Future Prospects for Standardization of Network Home Appliances" Toshiba Review, vol. 52, No. 1, Jan. 1, 2007, pp. 42-45.

* cited by examiner

HOST DEVICE AND SLAVE DEVICE CONTROLLING METHOD

CROSS-REFERENCE TO RELATED APPLICATIONS

This application claims the benefit of Korean Patent Application No. 10-2009-0076287, filed in the Korean Intellectual Property Office on Aug. 18, 2009, the disclosure of which is incorporated herein by reference.

BACKGROUND

1. Field

Aspects of the present invention relate to a host device and a slave device controlling method, and more particularly, to a host device which virtualizes a slave device connected to the host device locally and controls the slave device in a method of controlling a network device and a slave device controlling method.

2. Description of the Related Art

Generally, a host device is connected to a slave device through various connection channels such as a serial, a universal serial bus (USB), and Ethernet, and provides a user with various applications through the slave device being connected to the host device.

Applications provided from a host device should be implemented to comply with physical characteristics of the slave device connected to the host device and various communication protocols on the physical layer.

Accordingly, the developer of applications of a host device needs to develop applications that comply with driver software for the connection of various physical layers on the host device and various communication protocols that exist beyond the physical layers.

However, a developer has difficulty in implementing applications because the developer should consider various physical input and output ports since the recent host devices are capable of being connected to various types of slave devices. In addition, the host devices have poor compatibility between applications which drive different types of slave devices.

SUMMARY

Aspects of the present embodiment relate to a host device which virtualizes a slave device connected to the host device via a local loop and controls the slave device in a method of controlling a network device and a slave device controlling method.

Additional aspects and/or advantages will be set forth in part in the description which follows and, in part, will be apparent from the description, or may be learned by practice of the invention.

The foregoing and/or other aspects are achieved by providing a host device, including a network communication unit connected to a network; a local communication unit locally connected to a slave device; a virtualization unit to virtualize the slave device as a network device within the network; and a controlling unit to control the virtualized slave device as the network device.

The virtualization unit may include a determination unit to identify a communication protocol of the slave device; a message conversion unit to convert a message of the controlling unit and a message of the slave device into a message which complies with a communication protocol of the slave device and a message which complies with a communication protocol of the network device, respectively, according to the identified communication protocol; and a message transmission unit to transmit the message converted by the message conversion unit to a destination of the message.

The message conversion unit may analyze the message of the controlling unit and the message of the slave device and convert the messages to correspond to the analyzed result.

The virtualization unit may further include an Internet Protocol (IP) address generation unit to allocate an IP address to the slave device when the slave device is connected to the host device.

When the message of the slave device is received from an external network device connected to the network, the controlling unit may control the virtualization unit to convert the received message into a message which complies with the communication protocol of the slave device and transmit the converted message to the slave device.

The message transmission unit may control the network communication unit to transmit the converted message of the slave device to the external network device.

The communication protocol of the network device may be a universal plug-and-play (UPnP) communication protocol.

The slave device may be connected to the host device in at least one of a universal serial bus (USB) communication protocol, an IEEE 1394 communication protocol, a Serial Peripheral Interface (SPI) communication protocol, and a High-Definition Multimedia Interface (HDMI) communication protocol.

The foregoing and/or other aspects are achieved by providing a method to control a slave device locally connected to a host device via network, the slave device controlling method including virtualizing the slave device as a network device within the network; and controlling the virtualized slave device as the network device.

The virtualizing may include allocating an IP address to the slave device when the slave device is connected to the host device; and identifying a communication protocol of the slave device.

The controlling may include converting a message of the host device and a message of the slave device into a message which complies with a communication protocol of the slave device and a message which complies with a communication protocol of the network device, respectively, according to the identified communication protocol; and transmitting the converted message to a destination of the message.

The converting may analyze the message of the host device and the message of the slave device and convert the messages to correspond to the analyzed result.

When the message of the slave device is received from an external network device connected to the network, the controlling may convert the received message into a message which complies with the communication protocol of the slave device and transmit the converted message to the slave device.

The controlling may transmit the converted message of the slave device to the external network device.

The communication protocol of the network device may be a universal plug-and-play (UPnP) communication protocol.

The slave device may be connected to the host device in at least one of a universal serial bus (USB) communication protocol, an IEEE 1394 communication protocol, a Serial Peripheral Interface (SPI) communication protocol, and a High-Definition Multimedia Interface (HDMI) communication protocol.

The foregoing and/or other aspects are achieved by providing a slave device controlling method, including: converting a message at a host device connected to the slave device via a network from a first communication protocol to a second communication protocol so that the slave device is virtualized as a network device of the network.

The first communication protocol may be a communication protocol of the network device and the second communication protocol may be a communication protocol of the slave device, and the message may be converted from the first communication protocol of the network device into the second communication protocol of the slave device and transmitted to the slave device.

The first communication protocol may be a communication protocol of the slave device and the second communication protocol may be a communication protocol of the network device, and the message may be received from the slave device and converted from the first communication protocol of the slave device into the second communication protocol of the network device.

The host device may receive the message from an external network device, convert the message from a first communication protocol of the external network device into a second communication protocol of the slave device and transmit the converted message to the slave device.

BRIEF DESCRIPTION OF THE DRAWINGS

These and/or other aspects and advantages will become apparent and more readily appreciated from the following description of the embodiments, taken in conjunction with the accompanying drawings, of which.

DETAILED DESCRIPTION

Figure 1:
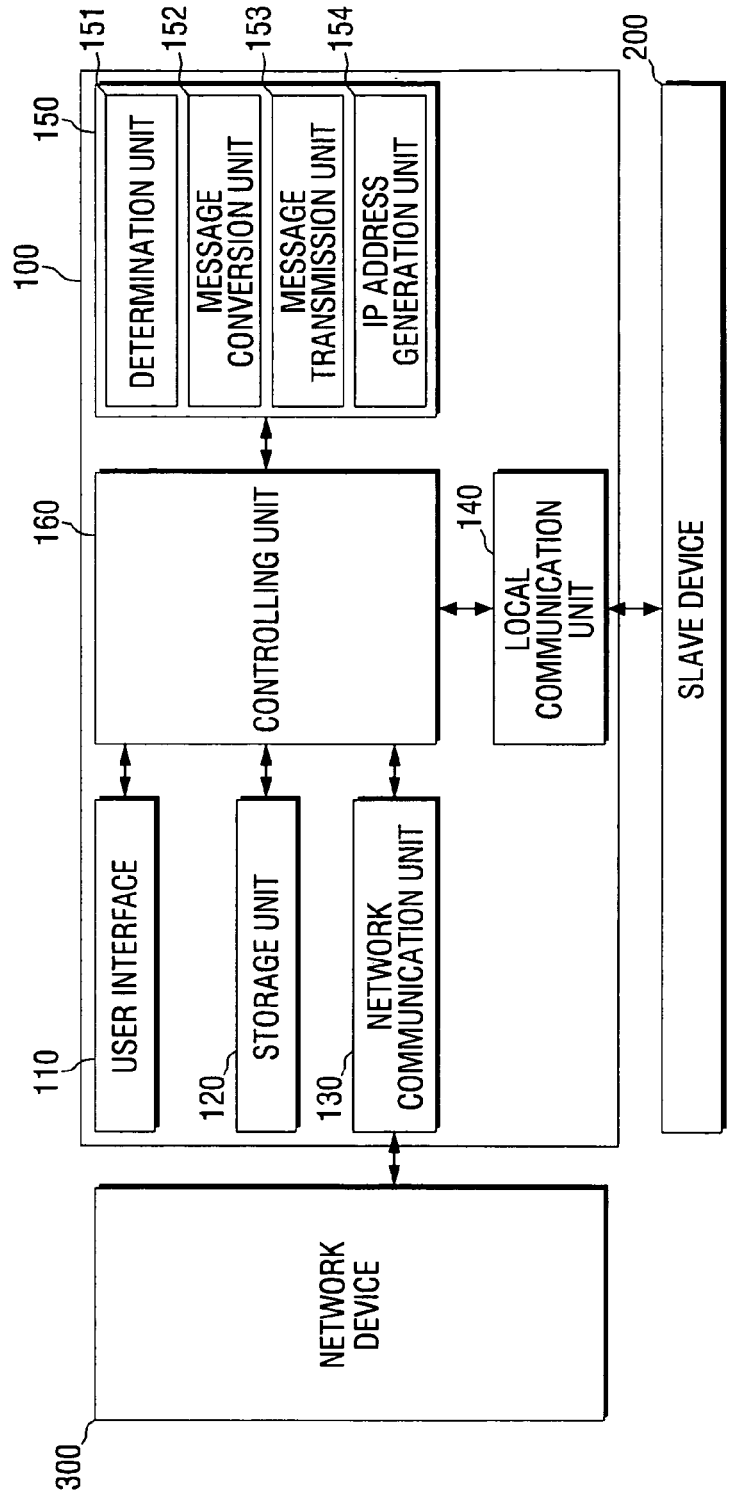
FIG. 1 is a block diagram of a host device according to an exemplary embodiment.

Reference will now be made in detail to the exemplary embodiments, examples of which are illustrated in the accompanying drawings, wherein like reference numerals refer to like elements throughout. The embodiments are described below, in order to explain the present invention by referring to the figures.

FIG. 1 is a block diagram of a host device according to an exemplary embodiment.

Referring to FIG. 1, the host device 100 includes a user interface 110, a storage unit 120, a network communication unit 130, a local communication unit 140, a virtualization unit 150, and a controlling unit 160. The host device 100 may provide a user with an application (service), and may be a personal computer (PC), a laptop computer, a television (TV), or a set-top box (STB), for example.

The user interface 110 includes a plurality of function keys so that a user may set or select various functions supported by the host device 100, and may display various information provided by the host device 100. The user interface 110 may be configured with a device, such as a touch pad, which simultaneously executes input and output operations, or a device combining a mouse with a monitor, for example. Accordingly, a user may use various application services supported by the host device 100 through the user interface 110.

The storage unit 120 may store content corresponding to various services supported by the host device 100, and protocol information of a slave device 200 which will be described later and an Internet Protocol (IP) address for the slave device 200. The storage unit 120 may be an internal storage medium of the host device 100, or an external storage medium, for example, a removable disk including a USB memory, a storage medium being connected to a host, and a web server over a network.

The network communication unit 130 may be connected to a network. In more detail, the network communication unit 130 may be connected to an external network device 300 via the network, and transceive a message to and from the external network device 300 according to a communication protocol of the external network device 300. The network communication unit 130 may be connected to the network by any suitable type of wired or wireless link. In this exemplary embodiment, the communication protocol of the network device may be a universal plug-and-play (UPnP) communication protocol, and the external network device 300 is another host device connected to the network which transceives a message to and from the host device 100 according to a network communication protocol.

Herein, the message may include various controlling commands between the host device 100, the slave device 200, and the network device 300, and a response signal for the controlling commands, and may be, for example, a service request, a state request, and a service providing signal in response to a service request.

The local communication unit 140 is connected to the slave device 200 via a local loop. Specifically, the local communication unit 140 is connected to the slave device 200 via a local loop, and transceives a message to and from the slave device 200 according to a communication protocol of the slave device 200. For example, if the slave device 200 is a USB device, the local communication unit 140 may transceive a message to and from the USB device according to a USB communication protocol, and if the slave device 200 is an Institute of Electrical and Electronics Engineers (IEEE) 1394 device, the local communication unit 140 may transceive a message to and from the IEEE 1394 device according to an IEEE 1394 communication protocol. The communication protocol of the slave device 200 may include a USB communication protocol, an IEEE 1394 communication protocol, a High-Definition Multimedia Interface (HDMI) communication protocol, a serial communication protocol, and a parallel communication protocol, for example. In this exemplary embodiment, the slave device 200 may be directly connected to the host device 100 according to at least one of a USB communication protocol, an IEEE 1394 communication protocol, a Serial Peripheral Interface (SPI) communication protocol, and a HDMI communication protocol, for example, to provide a user with a service.

The virtualization unit 150 virtualizes the slave device 200 as a network device within the network. In more detail, the virtualization unit 150 includes a determination unit 151, a message conversion unit 152, a message transmission unit 153, and an Internet Protocol (IP) address generation unit 154. The virtualization allows the slave device 200 to operate like a network device connected to the network by generating a virtual network device.

The determination unit 151 may determine a communication protocol of the slave device 200. Specifically, the determination unit 151 may recognize information required to communicate with the slave device 200, such as the type of the slave device 200 and the communication protocol. For example, if the slave device 200 connected to the host device 100 is a USB memory, the determination unit 151 may recognize that the corresponding slave device is a USB memory that communicates with the host device 100 according to a USB communication protocol, using a PnP communication protocol. In addition, the determination unit 151 may store the recognized information regarding the slave device 200 in the storage unit 120.

The message conversion unit 152 may convert the message of the controlling unit 160 and the message of the slave device 200 into a message which complies with the communication protocol of the slave device 200 and a message which complies with the communication protocol of the network device, respectively, according to the identified communication protocol of the slave device 200. Specifically, the message conversion unit 152 may convert the message of the slave device 200 into a message which complies with the communication protocol of the network device, and convert the message of the controlling unit 160 or the message of the external network device 300 into a message which complies with the communication protocol of the slave device 200.

The message conversion unit 152 may analyze the message of the controlling unit 160 and the message of the slave device 200, and convert the messages into messages corresponding to the analyzed result. In more detail, the message conversion unit 152 may analyze the messages between the slave device 200 and the host device 100 as well as the communication protocol of the slave device 200 and the communication protocol of the network device, and convert the messages into messages corresponding to the analyzed result. An algorithm or a look-up table related to the analysis of the messages may be stored in the storage unit 120. Accordingly, a developer may develop an application without considering a message standardization of the slave device 200. For example, if Message 1 indicates a power-off operation of the slave device 200, the message conversion unit 152 interprets the message indicating the power-off operation of the slave device 200 as Message 1 using the pre-stored algorithm or look-up table, and converts Message 1 into a message complying with the communication protocol of the slave device 200. On the other hand, if Message 1 is received from the slave device 200, the message conversion unit 152 analyzes Message 1 as the message indicating the power-off operation of the slave device 200 using the pre-stored algorithm or look-up table, and converts the message indicating the power-off operation into a message complying with the communication protocol of the network device.

The message transmission unit 153 may transmit the message which is converted by the message conversion unit 152 to the destination of the message. Specifically, the message transmission unit 153 may transmit the message, which is converted by the message conversion unit 152 to be suitable for the destination of the message transmitted to the virtualization unit 150, to the controlling unit 160 or the slave device 200. For example, if the virtualization unit 150 receives a message to be transmitted to the slave device 200 from the controlling unit 160, the message transmission unit 153 may control the local communication unit 140 to transmit the message which is converted by the message conversion unit 152 to the slave device 200. On the other hand, if the virtualization unit 150 receives a message to be transmitted to the controlling unit 160 from the slave device 200, the message transmission unit 153 may transmit the message which is converted by the message conversion unit 152 to the controlling unit 160.

If the message of the slave device 200 to respond to the request of the external network device 300 is input to the virtualization unit 150, the message transmission unit 153 may control the network communication unit 130 to transmit the message which is converted by the message conversion unit 152 to the external network device 300.

The IP address generation unit 154 may allocate an IP address to the slave device 200 if the slave device 200 is connected to the host device 100. Specifically, if the slave device 200 is connected to the host device 100, the IP address generation unit 154 may allocate an IP address for the slave device 200 connected to the host device 100 using an IP address for the host device 100. For example, if the IP address of the host device 100 is 127.0.0.1, the IP address generation unit 154 may allocate the IP address for the slave device 200 to be 127.0.0.1:0002. In this situation, the IP address generation unit 154 may generate an IP address for the slave device 200 connected to the host device 100 by searching for an available port of the host device 100.

The IP address generation unit 154 may store an IP address which is allocated to the slave device 200 in the storage unit 120. The IP address generation unit 154 may be implemented so that the same IP address is allocated to the slave device 200 which is repeatedly connected to the host device 100, or different IP addresses are allocated to the slave device 200 whenever the slave device is connected to the host device 100. The above operation of the IP address generation unit 154 may be performed when a user commands the virtualization for the slave device 200 or at the same time the slave device 200 is connected to the host device 100.

The controlling unit 160 may control the virtualized slave device 200 by applying the method of controlling the network device. In more detail, if the controlling unit 160 transmits a message to control the virtualized slave device 200, the controlling unit 160 may generate a message to comply with the communication protocol of the network device. The controlling unit 160 transmits the generated message complying with the communication protocol of the network device to the virtualization unit 150 and controls the virtualization unit 150 so that the message is converted to comply with the communication protocol of the slave device 200 and the converted message is transmitted to the slave device 200. If the host device 100 receives a response message from the slave device 200, the controlling unit 160 controls the virtualization unit 150 so that the message received through the local communication unit 140 is converted to comply with the communication protocol of the network device and thus the converted message is used to perform a service. Herein, the method of controlling the network device refers to a method of controlling a message between devices connected to a network, that is, the method of communicating between network devices using UPnP communication protocol.

If the message for the slave device 200 is received from the external network device 300 connected to the network, the controlling unit 160 may control the virtualization unit 150 to convert the message into a message which complies with the communication protocol of the slave device 200 and transmit the converted message to the slave device 200 since the received message complies with the communication protocol of the network device 300. If a response message is received from the slave device 200, the controlling unit 160 may control the virtualization unit 150 so that the message is converted to comply with the communication protocol of the network device 300 and thus the converted message is transmitted to the external network device 300.

As described above, since the host device 100 virtualizes the slave device 200 connected to the host device 100 as a network device and thus controls the slave device 200 in the network device controlling method, a developer may develop an application in consideration of only a single physical connection. In addition, since the slave device 200 connected to the host device 100 operates as a network device, the external network device 300 may easily control the slave device 200 connected to the host device 100.

The single slave device 200 is connected to the host device 100 in FIG. 1, but a plurality of slave devices may be connected to the host device 100 and a plurality of network devices may also be connected to the host device 100 via the network.

FIGS. 2 to 5 are views provided to explain a virtualization of a host device according to an exemplary embodiment.

Figure 2:
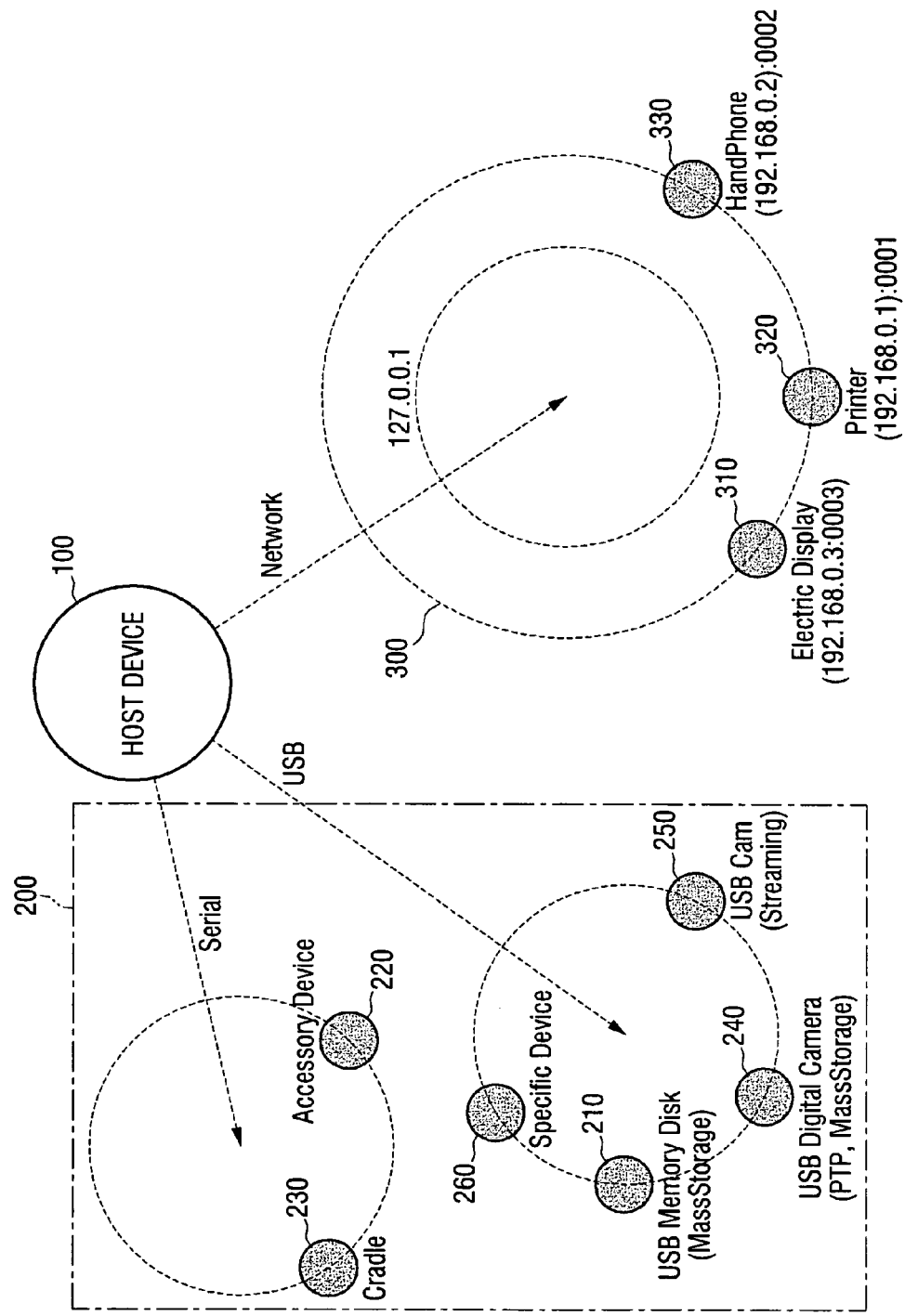
FIGS. 2 to 5 are views provided to explain a virtualization of a host device.

FIG. 2 illustrates the connection relationship between the host device 100, the slave device 200, and the external network device 300 before the virtualization operation is performed. Specifically, the host device 100 is connected to a cradle 230, an accessory device 220 in a serial communication manner, and is connected to a specific device 260, a USB memory disk 210, a USB digital camera 240, and a USB camcorder (CAM) 250, for example, in a USB manner. The host device 100 is connected to an electric display 310, a printer 320, and a hand phone 330, for example, via a network. In this exemplary embodiment, the USB memory disk 210, the accessory device 220, the cradle 230, the USB digital camera 240, the USB CAM 250, and the specific device 260 are exemplary devices of the slave device 200, and the electric display 310, the printer 320, and the hand phone 330 are exemplary devices of the external network device 300.

Figure 3:
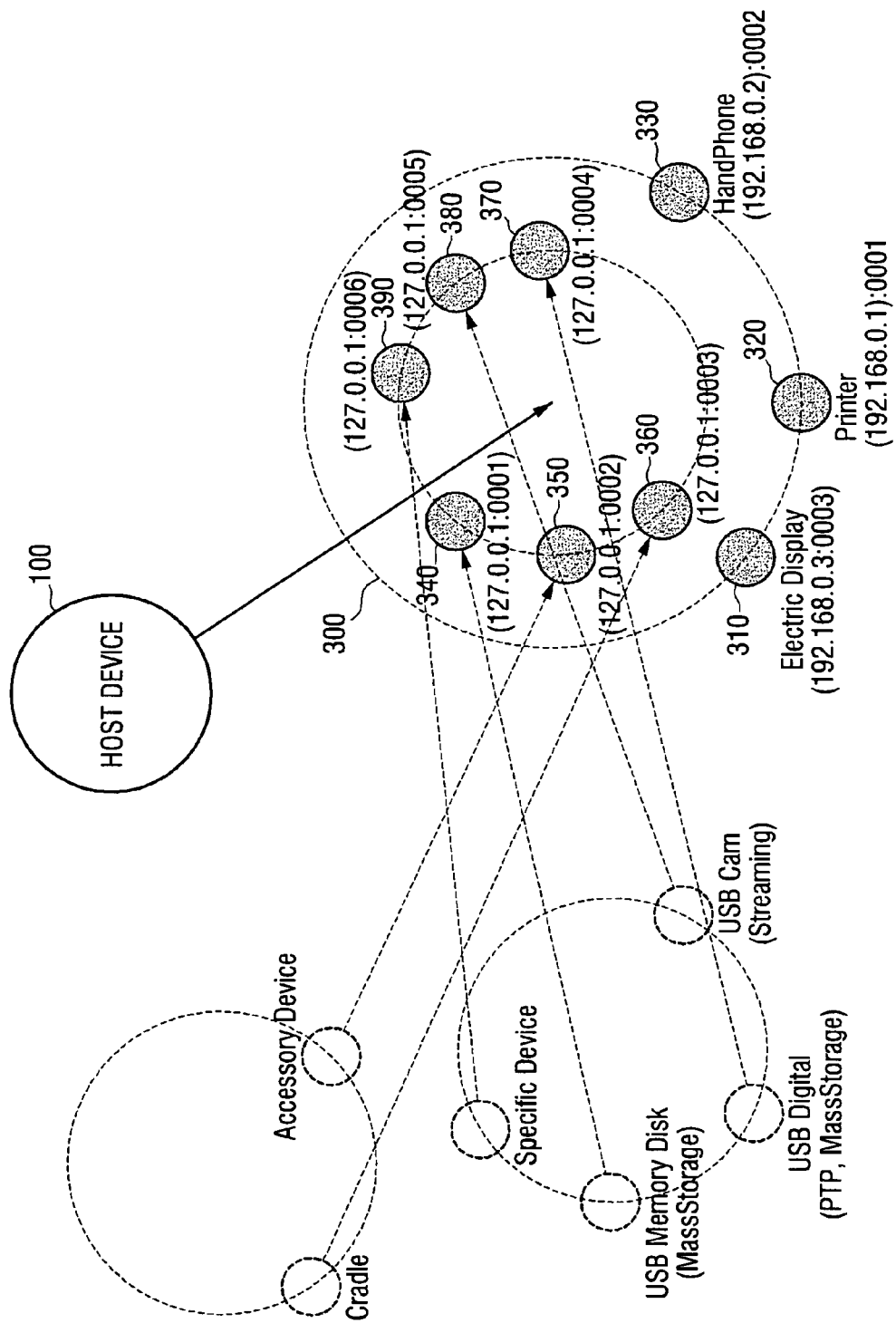

FIG. 3 illustrates the connection relationship between the host device 100, the slave device 200, and the external network device 300 after the virtualization operation is performed for the slave device 200. Specifically, the physical connection relationship between the devices is identical to that of FIG. 2, but the slave devices 210 to 260 are virtualized as a network device having each an IP address. Specifically, the cradle 230 connected to the host device 100 in a serial communication manner is virtualized as a network device 360 having IP address '127.0.0.1:0003,' and the USB cam 240 connected to the host device 100 in a USB manner is virtualized as a network device 380 having IP address '127.0.0.1: 0005.' The accessory device 220, the specific device 260, the USB memory disk 210, and the USB digital camera 240 may also be virtualized as a network device 350, 390, 340, and 370, respectively.

The slave device 200 is connected to the host device 100 in a serial communication manner and a USB manner in FIGS. 2 and 3, but the slave device 200 connected to the host device 100 via other local loops may also be virtualized.

Figure 4:
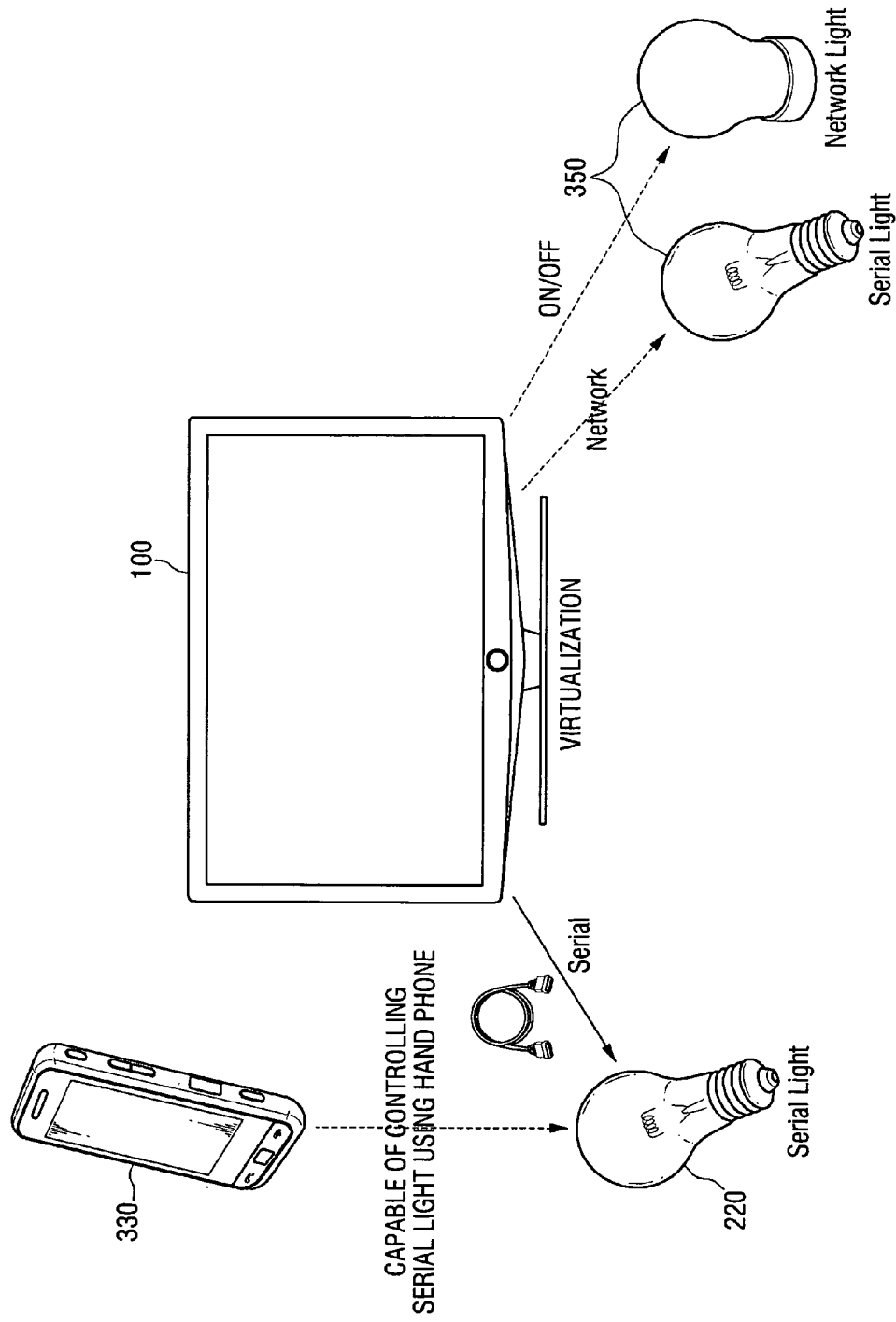

FIG. 4 is a view provided to explain a controlling method of the host device 100 when a slave device is virtualized.

Referring to FIG. 4, a slave device 220 is physically connected to the host device 100 via a local loop, but if the slave device 220 is virtualized, the host device 100 may control a virtualized slave device 350 in a method of controlling a network device. In addition, since the slave device 220 is virtualized as a network device 350, the hand phone 330, which is an external network device, may easily control the virtualized slave device 350.

Figure 5:
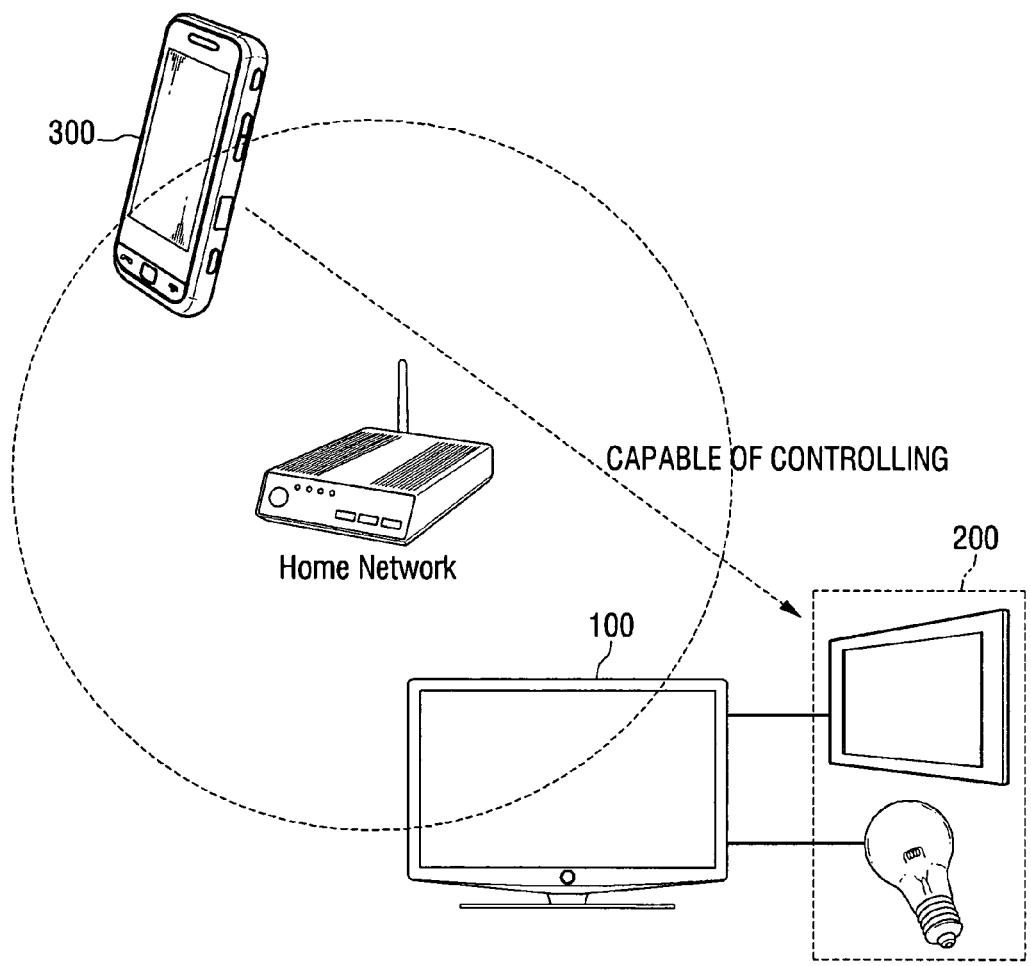

That is, the host device 100 and the external network device 300 connected each other via a network constitute a home network before the slave device 200 is virtualized as shown in FIG. 5, but the slave device 200 connected to the host device 100 is also an element which constitutes a home network after the slave device 200 is virtualized. Accordingly, the external network device 300 may easily control the slave device 200.

Figure 6:
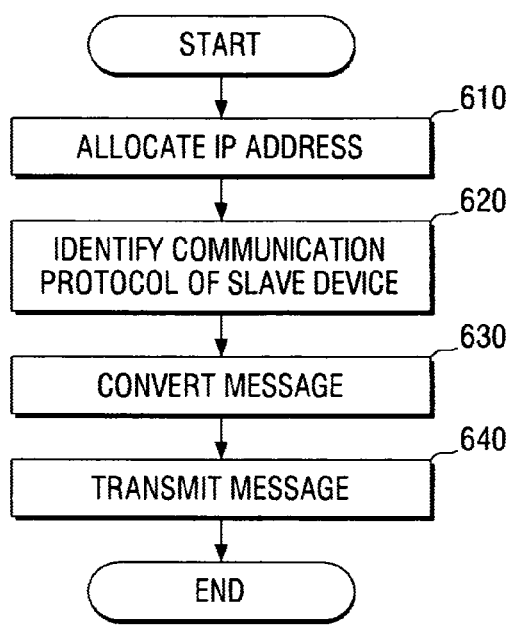
FIG. 6 is a flowchart of the process of controlling a slave device according to an exemplary embodiment.

FIG. 6 is a flowchart of the process of controlling a slave device according to an exemplary embodiment.

Referring to FIG. 6, a slave device may be virtualized as a network device within network. Specifically, if the slave device is connected to a host device, an IP address is allocated to the slave device in operation 610, and the communication protocol of the slave device connected to the host device may be identified in operation 620. In more detail, if the slave device is connected to the host device, an IP address may be allocated to the slave device connected to the host device using an IP address of the host device. In this situation, an IP address for the slave device connected to the host device may be generated by searching for an available port of the host device. The type of slave device connected to the host device and the communication protocol of the slave device may be identified using a PnP communication protocol. An IP address allocated to the slave device, the type of the slave device, and the communication protocol of the slave device may be pre-stored, and may also be used in subsequent operations. The operation of allocating an IP address and the operation of identifying the communication protocol of the slave device may be performed in reverse order.

The virtualized slave device may be controlled in a method of controlling a network device. Specifically, a message of the host device and a message of the slave device are converted to comply with the communication protocol of the slave device and the communication protocol of the network device, respectively, according to the identified communication protocol of the slave device in operation 630. The converted messages are transmitted to the corresponding destinations in operation 640. For example, if the host device transmits a message indicating the command of controlling the virtualized slave device to comply with the communication protocol of the network device, the host device converts the message complying with the communication protocol of the network device into a message complying with the communication protocol of the slave device and transmits the converted message to the slave device. If the host device receives a response message from the slave device, the host device converts the response message into a message complying with the communication protocol of the network device since the message on the slave device complies with the communication protocol of the slave device, and the host device uses the converted message.

If the host device receives the message of the slave device from an external network device connected to the host device via a network, the host device converts the received message to comply with the communication protocol of the slave device since the received message complies with the communication protocol of the network device, and transmits the converted message to the slave device. If the host device receives a response message from the slave device, the host device converts the response message into a message which complies with the communication protocol of the network device and transmits the converted message to the external network device. The communication protocol of the network device may be implemented to be a UPnP communication protocol.

Alternatively, when the operation of converting the messages is performed, the message of the host device and the message of the slave device are analyzed and thus converted to correspond to the analyzed result. The alternative operation has been described above with reference to the message conversion unit 152, and thus detailed description will be omitted.

Accordingly, a developer may develop an application in consideration of only a single physical connection, and the slave device connected to the host device may easily be controlled from the outside as the slave device connected to the host device operates as a network device.

As described above, according to the method of controlling the slave device according to the exemplary embodiment, since the slave device connected to the host device is virtualized to be controlled, the slave device connected to the host device may be easily controlled using an external device, and a developer may develop an application in consideration of only a single physical connection. The method of controlling the slave device as shown in FIG. 6 may be applied not only to the host device which is configured as shown in FIG. 1 but also image reading devices having other structures.

Although a few embodiments have been shown and described, it would be appreciated by those skilled in the art that changes may be made in this embodiment without departing from the principles and spirit of the invention, the scope of which is defined in the claims and their equivalents.

What is claimed is:

1. A host device, comprising:
   a processor;
   a network communication unit connected to a network to communicate with one or more external network devices having an Internet Protocol (IP) address;
   a local communication unit locally connected to at least one slave device, wherein one or more of the at least one slave devices is physically connected to the host device and do not operate according to an IP address;
   a virtualization unit that virtualizes the at least one slave device as a virtual network device within the network in which the one or more external network devices are connected, by allocating an IP address to the at least one slave device using an IP address and available port of the host device, when the at least one slave device is connected to the host device;
   a storage unit to store the IP address of the at least one slave device; and
   a controller that controls the virtualized at least one slave device as a virtual network device,
   wherein the virtualization unit uses the processor to virtualize the at least one slave device or to allocate the IP address to the at least one slave device,
   wherein the virtualization unit selectively allocates the IP address to the at least one slave device by using a same IP address previously allocated to the at least one slave device or by using a different IP address each time the at least one slave device is connected to the host device.

2. The host device according to claim 1, wherein the virtualization unit comprises:
   a determination unit that identifies a communication protocol of at least one slave device among the one or more at least slave devices;
   a message conversion unit that converts a message of the controller into a message which complies with a communication protocol of the at least one slave device and a message of the at least one slave device into a message which complies with a communication protocol of an external network device according to the identified communication protocol; and
   a message transmission unit that transmits the message converted by the message conversion unit to a destination of the message,
   wherein at least one of the determination unit, the message conversion unit, and the message transmission unit use the processor to identify the communication protocol, convert the message, and to transmit the message.

3. The host device according to claim 2, wherein the message conversion unit analyzes the message of the controller and the message of the at least one slave device and converts the messages to correspond to the analyzed result.

4. The host device according to claim 2, wherein when message of the at least one slave device is received from an external network device connected to the network, the controller controls the virtualization unit to convert the received message into a message which complies with the communication protocol of the at least one slave device and to transmit the converted message to the at least one slave device.

5. The host device according to claim 4, wherein the message transmission unit controls the network communication unit to transmit the converted message of the at least one slave device to the external network device.

6. The host device according to claim 2, wherein the communication protocol of the one more external network devices is a universal plug-and-play (UPnP) communication protocol.

7. The host device according to claim 1, wherein the at least one slave device is connected to the host device in at least one of a universal serial bus (USB) communication protocol, an IEEE 1394 communication protocol, a Serial Peripheral Interface (SPI) communication protocol, and a High-Definition Multimedia Interface (HDMI) communication protocol.

8. A method to control at least one slave device locally connected to a host device via a first network, the slave device controlling method comprising:
   connecting to a second network to communicate with one or more external network devices having an Internet Protocol (IP) address;
   virtualizing the at least one slave device as a virtual network device within the second network, wherein the virtualizing comprises allocating an Internet Protocol (IP) address to the at least one slave device using an IP address and available port of the host device, when the at least one slave device is connected to the host device;
   storing the IP address of the at least one slave device in a storage unit of the host device; and
   controlling the virtualized at least one slave device as a virtual network device within the second network,
   wherein one or more of the at least one slave devices is physically connected to the host device and do not operate according to an IP address,
   wherein the virtualizing further comprises selectively allocating the IP address to the at least one slave device by using a same IP address previously allocated to the at least one slave device or by using a different IP address each time the at least one slave device is connected to the host device.

9. The slave device controlling method according to claim 8, wherein the virtualizing further comprises:
   identifying a communication protocol of the at least one slave device.

10. The slave device controlling method according to claim 9, wherein the controlling comprises:
    converting a message of the host device into a message which complies with a communication protocol of the at least one slave device and a message of the at least one slave device into a message which complies with a communication protocol of an external network device, according to the identified communication protocol; and
    transmitting the converted message to a destination of the message.

11. The slave device controlling method according to claim 10, wherein the converting analyzes the message of the host device and the message of the at least one slave device and converts the messages to correspond to the analyzed result.

12. The slave device controlling method according to claim 8, wherein when the message of the at least one slave device is received from an external network device connected to the second network, the controlling converts the received message into a message which complies with the communication protocol of the at least one slave device and transmits the converted message to the at least one slave device.

13. The slave device controlling method according to claim 12, wherein the controlling transmits the converted message of the at least one slave device to the external network device.

14. The slave device controlling method according to claim 9, wherein the communication protocol of the one or more external network devices is a universal plug-and-play (UPnP) communication protocol.

15. The slave device controlling method according to claim 8, wherein the at least one slave device is connected to the host device in at least one of a universal serial bus (USB) communication protocol, an IEEE 1394 communication protocol, a Serial Peripheral Interface (SPI) communication protocol, and a High-Definition Multimedia Interface (HDMI) communication protocol.

16. A slave device controlling method, comprising:
allocating an Internet Protocol (IP) address to at least one slave device using an IP address and available port of a host device, when the at least one slave device is connected to the host device, so that the at least one slave device is virtualized as a virtual network device within a first network which includes one or more external network devices having an Internet Protocol (IP) address, the one or more external network devices being connected to the host device on the first network;
storing the IP address of the at least one slave device in a storage unit of the host device; and
converting a message at the host device connected to the at least one slave device via a local network, from a first communication protocol to a second communication protocol,
wherein one or more of the at least one slave devices is physically connected to the host device and do not operate according to an IP address,
wherein the allocating further comprises selectively allocating the IP address to the at least one slave device by using a same IP address previously allocated to the at least one slave device or by using a different IP address each time the at least one slave device is connected to the host device.

17. The slave device controlling method according to claim 16, wherein the first communication protocol is a communication protocol of the one or more external network devices and the second communication protocol is a communication protocol of the at least one slave device, and the message is converted from the first communication protocol of the one or more external network devices into the second communication protocol of the at least one slave device and transmitted to the at least one slave device.

18. The slave device controlling method according to claim 16, wherein the first communication protocol is a communication protocol of the at least one slave device and the second communication protocol is a communication protocol of the one or more external network devices, and the message is received from the at least one slave device and converted from the first communication protocol of the at least one slave device into the second communication protocol of the one or more external network devices.

19. The slave device controlling method according to claim 16, wherein the host device receives the message from an external network device, converts the message from a first communication protocol of the external network device into a second communication protocol of the at least one slave device and transmits the converted message to the at least one slave device.

20. The host device according to claim 3, wherein the storage unit stores communication protocol information of the at least one slave device, to store the Internet Protocol (IP) address of the at least one slave device, and stores a look-up table relating to the analysis of the message conversion unit.

21. The host device according to claim 2, wherein the host device is connectable to the at least one slave device via a universal serial bus (USB) communication protocol, an IEEE 1394 communication protocol, a Serial Peripheral Interface (SPI) communication protocol, and a High-Definition Multimedia Interface (HDMI) communication protocol, and
the determination unit identifies the communication protocol of the at least one slave device when the at least one slave device is connected to the host device, and stores the identified communication protocol of the at least one slave device in the storage unit.

* * * * *